US006924634B2

United States Patent
Jianping et al.

(10) Patent No.: US 6,924,634 B2
(45) Date of Patent: Aug. 2, 2005

(54) POWER SUPPLY WITH FEED FORWARD CIRCUIT

(75) Inventors: Ying Jianping, Taoyuan (TW); Wang Xiangcheng, Taoyuan (TW); He Jingfei, Taoyuan (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 35 days.

(21) Appl. No.: 10/749,632

(22) Filed: Dec. 31, 2003

(65) Prior Publication Data

US 2004/0263141 A1 Dec. 30, 2004

(30) Foreign Application Priority Data

Jun. 25, 2003 (TW) ........................................ 92117344 A

(51) Int. Cl.$^7$ ............................ G05F 5/00; G05F 1/40
(52) U.S. Cl. .................... 323/299; 323/284; 323/301
(58) Field of Search ............................. 323/299, 300, 323/301, 284, 285

(56) References Cited

U.S. PATENT DOCUMENTS

| 5,477,112 | A | * | 12/1995 | Lesea | 315/219 |
| 6,529,354 | B1 | * | 3/2003 | Shteynberg et al. | 361/18 |
| 6,538,419 | B1 | * | 3/2003 | Allen et al. | 323/285 |
| 6,653,824 | B1 | * | 11/2003 | Whitlock | 323/344 |
| 6,654,261 | B2 | * | 11/2003 | Welches et al. | 363/41 |
| 6,828,762 | B2 | * | 12/2004 | Brkovic | 323/222 |

* cited by examiner

*Primary Examiner*—Bao Q. Vu
(74) *Attorney, Agent, or Firm*—Perkins Coie LLP

(57) ABSTRACT

In those conventional arts, a power supply with a voltage holdup circuit generates a peak voltage in output voltage when a switching operation is occurred, and so the quality of the output voltage is decreased and a risk of operating fault in a load apparatus. The present invention employs a feed forward circuit to immediately generate a forward feedback signal when a switching operation is occurred. Hence, the output voltage can be faster corrected to a accurate output voltage and so the peak voltage can be reduced.

20 Claims, 7 Drawing Sheets

US 6,924,634 B2

POWER SUPPLY WITH FEED FORWARD CIRCUIT

CROSS REFERENCE TO RELATED APPLICATIONS

This application claims priority to Taiwan Patent Application No. 092117344, filed Jun. 25, 2003, which is hereby incorporated by reference in its entirety.

TECHNICAL FIELD

This invention relates to a power supply with a voltage holdup circuit, and more particularly to a power supply having a feedback circuit.

BACKGROUND

Due to a common server has a request of high quality for a supplying of a power supply, especially for some global servers like a bank systems, traffic signal controlling systems that do not permit a fault occurred resulted from a power failure. Therefore, a longer voltage holdup time is required for a server power supply, i.e.: when a power failure is occurred, the output voltage can be maintained a certain time for ensuring data losses being not occurred in the server. A common power supply can not achieve the request due to the voltage holdup time being too shorter.

FIG. 1 shows a schematic diagram of a power supply with variable turns ratio. It employs the method of changing turns ratio to extend the voltage holdup time for achieving the request of the server. In FIG. 1, the capacitor C1 is a bulk capacitor in the DC (direct current) input bus and the transformer T1 is a high frequency transformer. By the DC/DC converter CON, the voltage of the DC input bus is transferred to a high-frequency pulse voltage applied to the primary winding N1 of the transformer T1. A full-wave rectifier is applied to the secondary side of the transformer T1. In view of the function of the circuit, the primary rectifier comprises first secondary windings N21, N22 and first rectifying diodes D1 and D2. The additional rectifier comprises second secondary windings N31, N32 and second rectifying diodes D3 and D4. Switching transistor Q5 is a switch between the two rectifiers and in generally, is a MOSFET. A switch signal is generated by a control circuit CTRL and an input control voltage BV of the control circuit CTRL is equal to voltage Vc1 of the bulk capacitor C1. A common filter circuit of the primary rectifier and the additional rectifier comprises an inductance Lf and a capacitor Cf. When the voltage in input bus is regular, the control circuit CTRL does not generate a switch signal, a gate-voltage of the switching transistor Q5 is low voltage and the switching transistor Q5 turns off. Therefore, only primary rectifier participates in the voltage-transforming in secondary side of the transformer T1. If power cut is happened, the voltage across the capacitor C1 is decreasing until a predetermined voltage Vset (adjustable). When the voltage across the capacitor C1 is equal to the voltage Vset, the control circuit CTRL generates a pulse of switch signal with a certain width and so the switching transistor Q5 turns on. Primary rectifier and the additional rectifier participate in the voltage-transforming in secondary side together. Hence, the output voltage Vo is maintained for a longer time after power cut.

FIG. 2 shows a schematic diagram of voltages when the voltage holdup circuit is working. In FIG. 2, Vc1 is the voltage across the bulk capacitor C1, i.e.: the controlling voltage BV of the control circuit CTRL; Vo is the output voltage of the power supply; Vgs is the voltage of the switch signal, i.e.: the gate-voltage of the switching transistor Q5; and Vset is a predetermined voltage of the control circuit CTRL. When the voltage in input bus is regular (higher than the predetermined voltage Vset), the output voltage maintains in a predetermined output voltage, the switch signal Vgs of the control circuit CTRL is low voltage. Therefore, the switching transistor Q5 turns off and only primary rectifier participates in the voltage-transforming in secondary side. At the time t0, power cut is happened and the voltage Vc1 across the capacitor C1 and the controlling voltage BV of the control circuit CTRL are decreasing. At the time t1, the voltage BV is equal to the predetermined voltage Vset and the switch signal Vgs of the control circuit CTRL is turned into high voltage and maintains for a certain time. Therefore, the switching transistor Q5 turns on and the primary rectifier and the additional rectifier participate in the voltage-transforming in secondary side together. At the time t2, the output voltage of the power supply begins to decrease and the voltage holdup time th is equal to (t2−t0). The switch signal Vgs of the control circuit CTRL must at least maintain high voltage until the time t2.

If the DC/DC converter in the primary side of the transformer T1 is a phase shifted full bridge converter, the relationship between the voltage Vc1 across the capacitor C1 and the output voltage Vo can be written as:

$$V_o = 2nV_{C1}D \quad (1)$$

Wherein, n is the turns ratio of transformer; and D is the duty cycle of the switching transistor.

The voltage holdup time can be written as:

$$th = \frac{1}{P_o} \cdot \frac{1}{2} C_1 \left[ V_{t0}^2 - \left( \frac{V_o}{2nD_{\max}} \right)^2 \right] \cdot \eta \quad (2)$$

Wherein, $P_0$ is the output power of the power supply; $C_1$ is the capacitance of capacitor C1; $V_{t0}$ is the value of the voltage across capacitor C1 at the time t0; $D_{max}$ is the maximum duty cycle; and $\eta$ is the transforming efficiency of the transformer.

When the additional rectifier participates in the voltage-transforming in secondary side, the turns ratio of transformer T1 is transferred from n2/n1 to (n2+n3)/n1, wherein the turns of the primary winding is n1, the turns of the first secondary windings N21 and N22 is n2, and the turns of the second secondary windings N31 and N32 is n3. According to Eq. (2), if other parameters is constant, the minimum capacitor voltage Vo/2nD_{max} becomes smaller due to the ratio turns n becoming larger, and so the voltage holdup time th also becomes longer.

FIG. 3A and FIG. 3B show measured voltage waveforms under output voltage being 12V with voltage holdup circuit. The voltage waveforms in FIG. 3A are measured without the additional rectifier, wherein Vc1 is the voltage across capacitor C1, Vo is the output voltage, Vac is the voltage of the alternating current (AC) voltage, and the voltage holdup time is 11.4 ms. The voltage waveforms in FIG. 3B are measured with the additional rectifier, wherein Vgs is the gate-voltage of the switching transistor Q5, and the voltage holdup time is extended to 22.0 ms.

Due to the additional rectifier participating in the voltage-transforming during the voltage holdup time, a required voltage endurance and a required current endurance of the additional rectifier are little and the additional rectifier is almost without a problem of diffusing heat. Therefore, the dimension of the additional rectifier can be small. However, the additional rectifier brings another problem of a peak voltage in the output voltage resulted from the additional rectifier participating in the voltage-transforming. FIG. 3B shows that a peak voltage is about 220 mV when a switching operation of the switch is done, i.e.: the additional rectifier participating in the voltage-transforming.

The reason that the peak voltage is occurred can be obtained from a analysis of the regulating feature of the converter. As shown in FIG. 4, when the gate-voltage of the switching transistor Q5 is high voltage, the additional rectifier is switched to participate in the voltage-transforming with the primary rectifier. A duty cycle D of transistors in the DC/DC converter can be obtained according to a voltage difference Vd from a voltage regulator being compared with a sawtooth wave Vt. The duty cycle D also is a duty cycle of the output voltage of the transformer (no matter that the duty cycle loss). If the turns ratio of the transformer is n2/n1, the voltage across the capacitor C1 is Vset, and the duty cycle D is Dset at the start of the switching duration. Then, the turns ratio suddenly increases to become (n2+n3)/n1, but the voltage across the capacitor C1 is still Vset, and the duty cycle D is still Dset. Hence, according to Eq. (1), the voltage across the secondary winding of the transformer is instantly increased. However, a regulating rate of the duty cycle D through a feedback network of the power supply is limited by a cutoff frequency and a wire delay thereof. Therefore, after the switching, the voltage regulator still maintains a state, as well as that before switching, for a certain time. Therefore, the duty cycles of the transistor and the voltage across the secondary winding also maintain constant for a certain time after the switching. Hence, the voltage across the secondary winding passes through the filter circuit and a peak voltage is occurred in the output voltage of the power supply during the switching duration.

FIG. 5A and FIG. 5B show the output voltage waveforms during the switching duration. The waveforms are measured under the state that the DC/DC converter is a phase shifted full bridge converter and the output loading is 48V and 5A. The waveforms in FIG. 5B are enlarged from the waveform in FIG. 5A. The channel 2 is the 48V output signal and the channel 3 is the switch signal. The duration of the switch signal must be suitably determined for ensuring that the voltage holdup time is enough long (21 ms, in general). FIG. 5A and FIG. 5B show that a peak voltage is about 320 mV during the switching duration.

In general, the peak voltage of the output voltage is limited to smaller than a certain magnitude, when the additional rectifier is switched to participate with the primary rectifier. However, in those conventional arts, the server power supply is limited by the cutoff frequency and the wire delay and so the problem of the peak voltage is occurred. Hence, the quality of the power supply is lowered and so some unexpected problems will occur.

SUMMARY

One of objectives of the present invention is to provide a feed forward circuit for reducing the magnitude of the peak voltage.

Another objective of present invention is to provide a simple and low cost feed forward circuit for achieving the purpose of reducing the peak voltage.

Another objective of present invention is to provide a power supply having a feed forward circuit for improving the quality of output of a power supply.

As aforementioned, the present invention provides a power supply with a feed forward circuit comprising a power supply, a switch signal generator, and a feed forward circuit. The power supply comprises a transformer, a switch, a rectifier circuit, and a filter circuit. When a feed forward circuit receives a switch signal, the switch is switched to change a turns ratio of the transformer. The feed forward circuit simultaneously receives the switch signal and then transmits a feed forward signal to a feedback circuit for restraining a peak voltage of a output voltage of the power supply resulted from the turns ratio changing.

The present invention also provides a method for restraining a switching peak voltage of a power supply with a feed forward circuit comprising: providing a power supply, providing a switch signal generator, and providing a feed forward circuit. When a feed forward circuit receives a switch signal, a switch of the power supply is switched to change a turns ratio of a transformer of the power supply. The feed forward circuit simultaneously receives the switch signal and then transmits a feed forward signal to a feedback circuit for restraining a peak voltage of a output voltage of the power supply resulted from the turns ratio changing.

Hence, in the conventional arts, a power supply with a voltage holdup circuit has the problem of peak voltage during a switching duration and the quality of the output voltage is decrease, so that some unexpected problems will occur. The present invention provides a feed forward circuit, that can be a simple differetiator, for reducing the magnitude of the peak voltage with low cost and for improving the quality of output of the power supply.

BRIEF DESCRIPTION OF THE DRAWINGS

The foregoing aspects and many of the attendant advantages of this invention will become more readily appreciated as the same becomes better understand by reference to the following detailed description, when taken in conjunction with the accompanying drawings, where in.

DETAILED DESCRIPTION

Some sample embodiments of the invention will now be described in greater detail. Nevertheless, it should be recognized that present invention can be practiced in a wide range of other embodiments besides those explicitly described, and the scope of the present invention is expressly not limited expect as specified in the accompanying claims.

Then, the components of the different elements are not shown to scale. Some dimensions of the related components are exaggerated and meaningless portions are not drawn to provide a more clear description and comprehension of the present invention.

When the additional rectifier is switching to participate in voltage-transforming, the output of the voltage regulator can be regulating for rapidly adjusting the duty cycle of the switching transistors in the primary side of the transformer. Therefore, the interval between the switching time point and the adjusting time point of the duty cycle can be reduced and the output voltage also can rapidly be regulated for efficiently reducing the peak voltage.

The present invention employs a feed forward circuit to achieve the purpose on the basis of the aforementioned essence of the present invention. A feed forward circuit directly receives a switch signal from a control circuit, and then transfers the switch signal into a feed forward signal (i.e.: a differential value of the switch signal). The feed forward signal is transmitted to a voltage regulator of a voltage loop in the converter. Therefore, the duty cycle of the switch can be more rapidly regulated by the voltage regulator and the feed forward signal is ended after the switching is completed and the output is stable. Hence, the method of the present invention only improves the dynamic characteristic of the power supply during the switching duration and does not affect the static characteristic of the power supply after and before switching. Moreover, the feed forward circuit is very simple.

Figure 6:
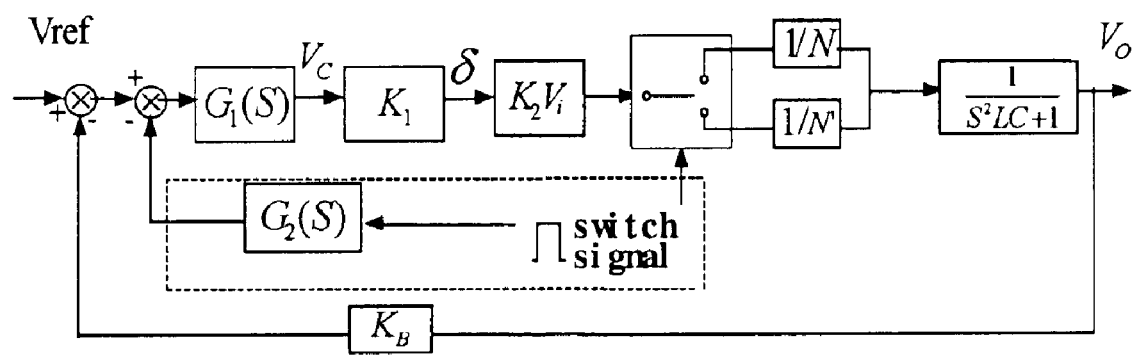
FIG. 6 shows a schematic diagram of illustrating the controlling principle of the system according to the present invention.

FIG. 6 shows a schematic diagram of illustrating the controlling principle of the system of the present invention. In FIG. 6, Vref is predetermined in the voltage loop; $G_1(S)$ is a transfer function of the voltage regulator that transmits a regulating voltage Vc to a PWM (pulse width modulation); $K_1$ is a transfer function of the PWM that transmits a correcting value δ to a DC/DC converter; $K_2V_i$ is a transfer function of the DC/DC converter; 1/N and 1/N' are transfer functions of the rectifier before switching and after switched respectively; $1/(S^2LC+1)$ is a transfer function of an output filter; the $K_B$ is a transfer function of the feedback network; and $G_2(S)$ is a transfer function of a feed forward circuit that is surrounded with a dash line. Hence, the switch signal is directly transferred to the voltage regulator through the feed forward circuit, and compared with that in the conventional arts, the switch signal is more rapidly transferred to the voltage regulator to increase the regulating rate for reducing the magnitude of the peak voltage in the output voltage when switching.

Figure 7:
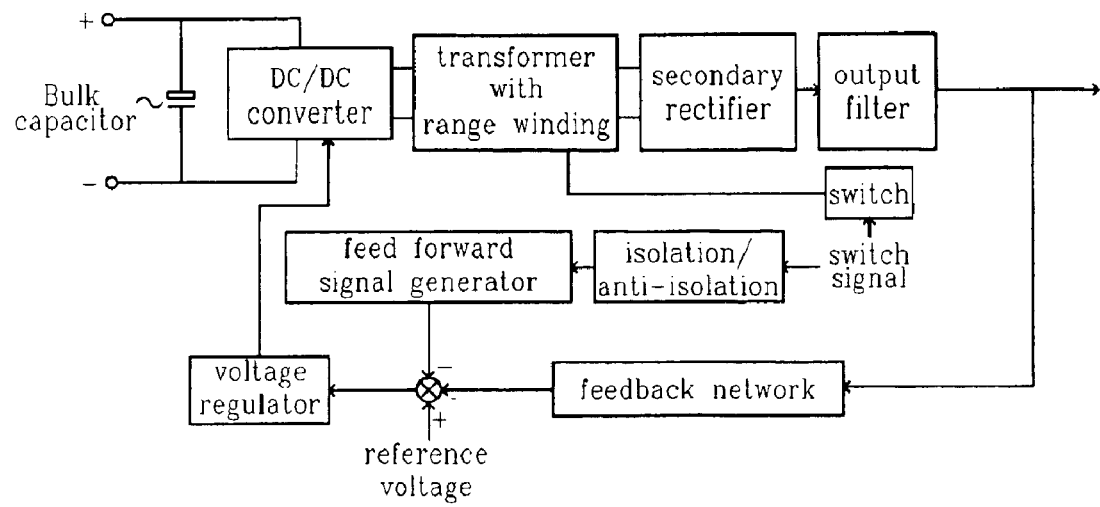
FIG. 7 is a schematic diagram of a circuit topology according to the present invention.

FIG. 7 is a schematic diagram of a circuit topology according to the present invention. The switch signal is simultaneously transferred to the switch and the feed forward signal generator for generating a feed forward signal to the voltage regulator and then the voltage regulator generating a correcting signal to the DC/DC converter. The relationship of a switch signal generator and the feed forward signal generator is isolated or anti-isolated, wherein the switch signal generator generates the switch signal when a voltage across the bulk capacitor is lower than a predetermined value. Compared with that in the conventional arts, the switch signal only is transferred to the switch, and then pass through the transformer, rectifier, the output filter, and the feedback network to the feedback rails, in the present invention, the switch signal is simultaneously transferred to the feed forward signal generator and then is transmitted to the voltage regulator. Hence, the voltage regulating rate can be increased.

Figure 1:
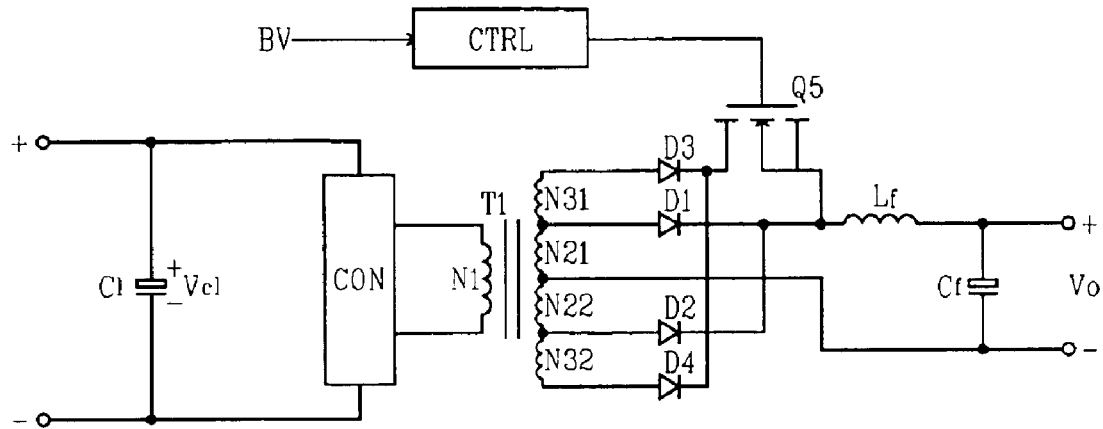
FIG. 1 (prior art) is a schematic diagram of a power supply with variable turns ratio.
Figure 2:
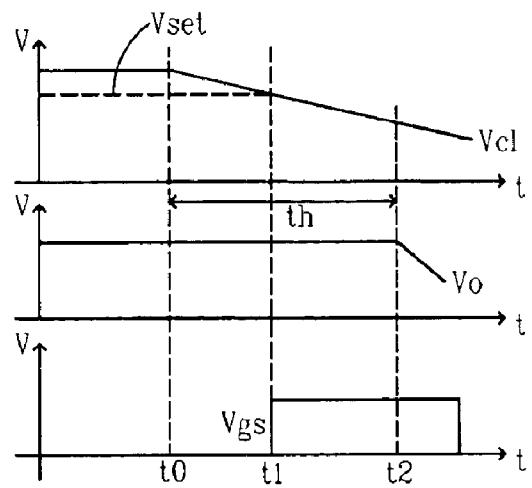
FIG. 2 (prior art) is a schematic diagram of voltages when the voltage holdup circuit is working.
Figure 3A:
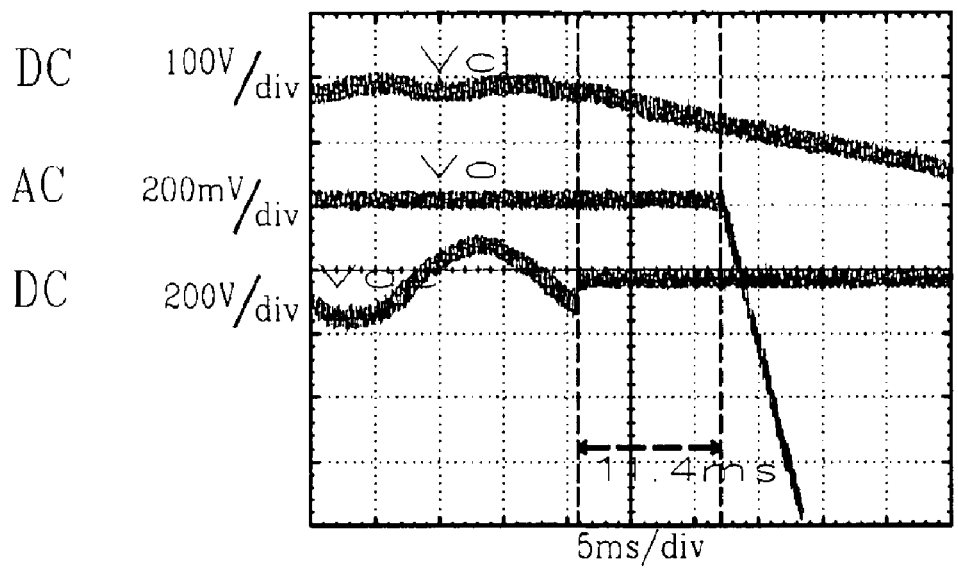
FIG. 3A and FIG. 3B (prior arts) show measured voltage waveforms under output voltage being 12V with voltage holdup circuit.
Figure 3B:
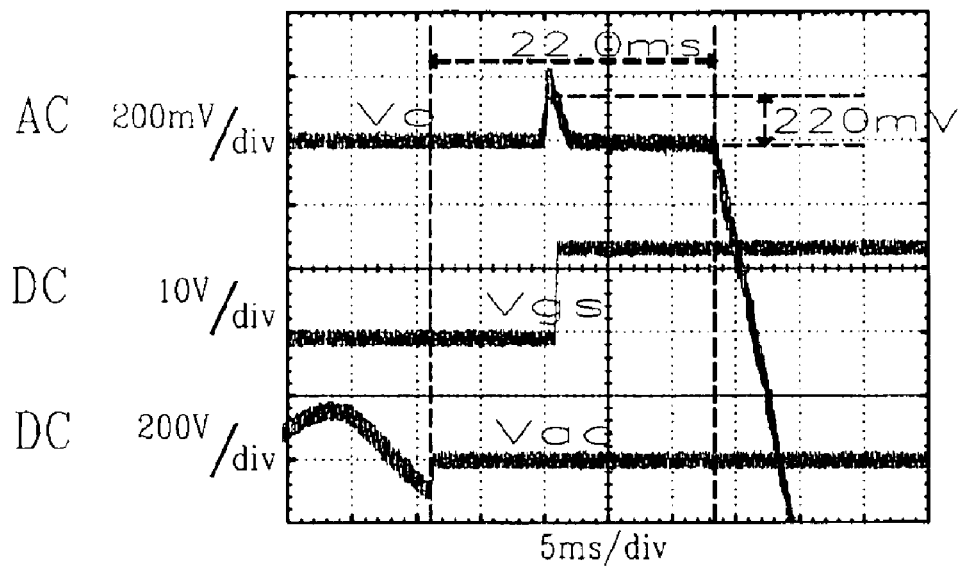
Figure 4:
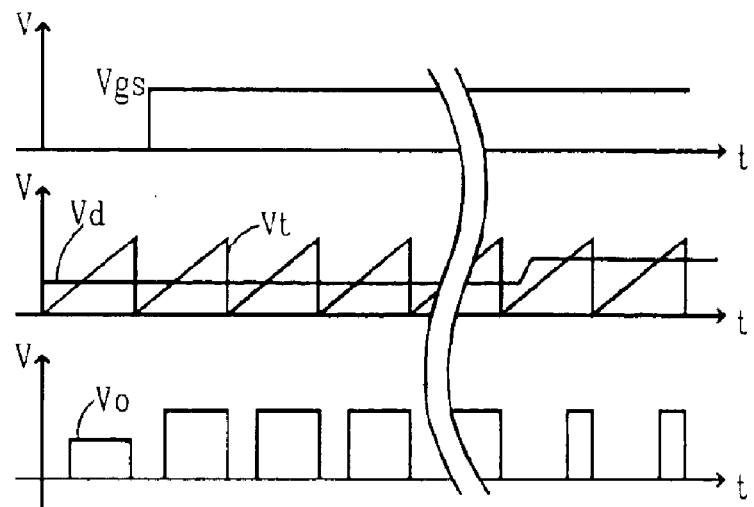
FIG. 4 (prior art) shows a schematic diagram of the relationship among the switch signal, the voltage of the voltage regulator, and the output voltage.
Figure 5A:
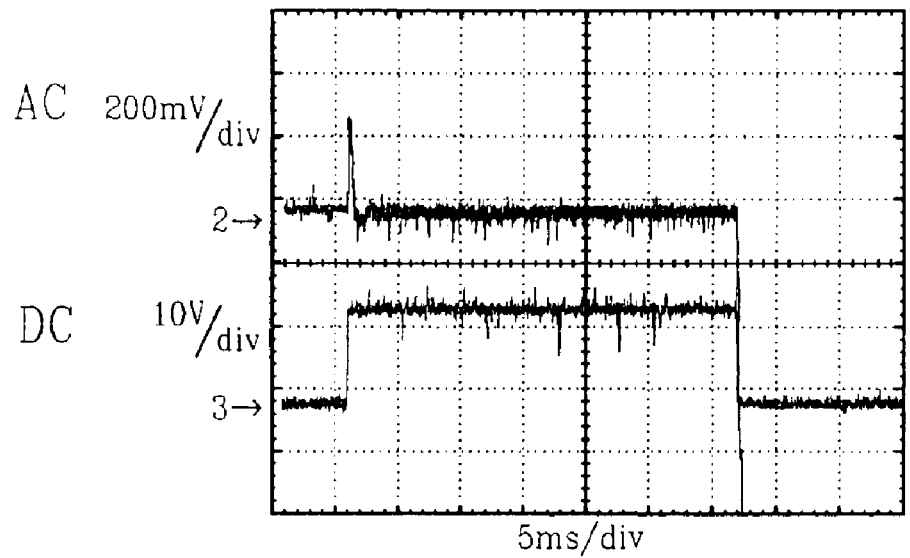
FIG. 5A and FIG. 5B (prior arts) show the output voltage waveforms during the switching under the output of 48A and 5A.
Figure 5B:
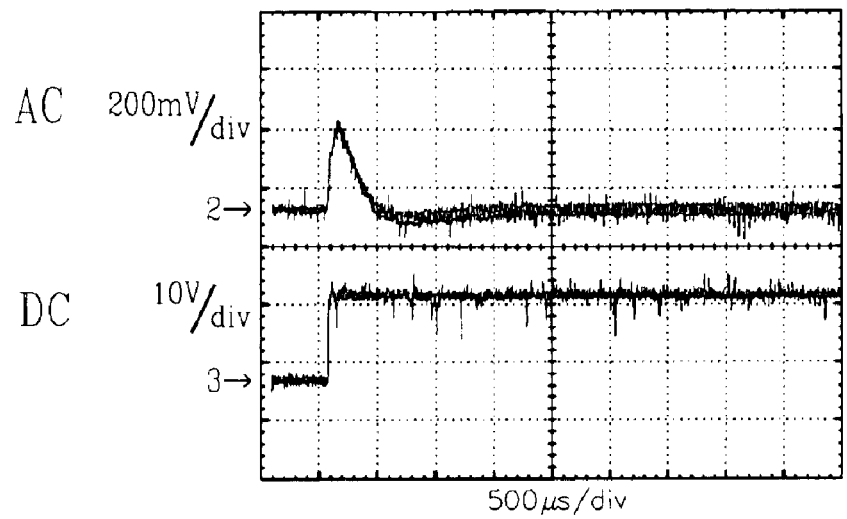
Figure 8:
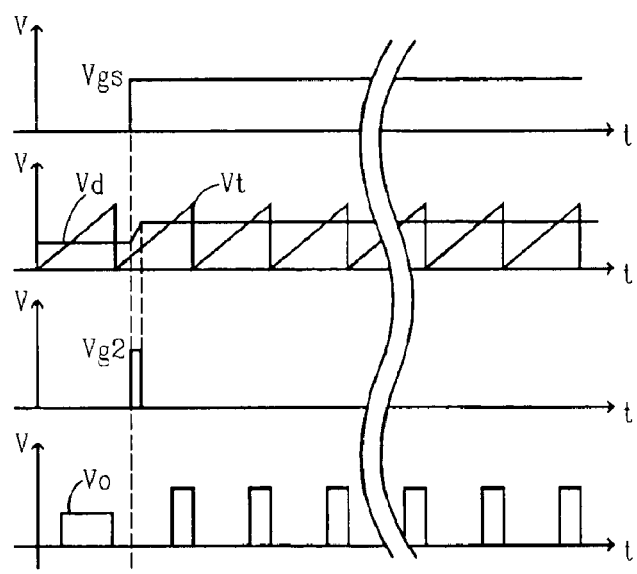
FIG. 8 shows a schematic diagram of the relationship among the switch signal, the voltage of the voltage regulator, and the output voltage with a feed forward circuit according to the present invention.
Figure 9A:
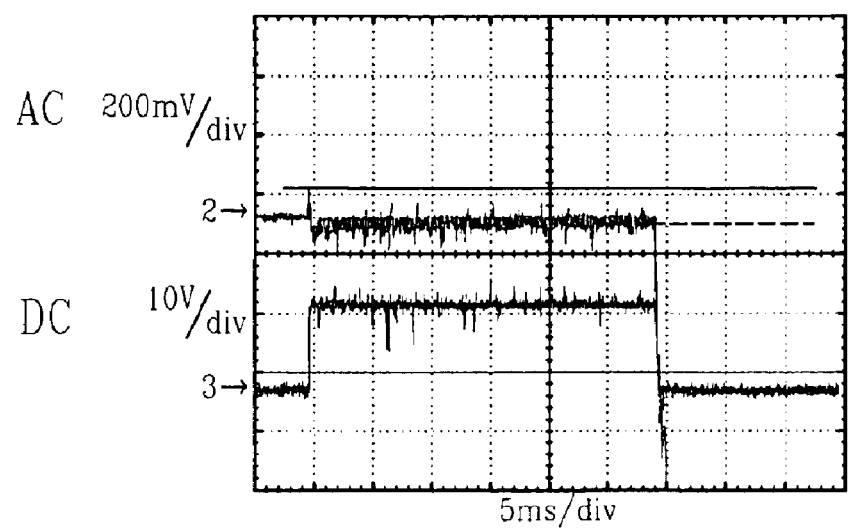
FIG. 9A and FIG. 9B show the output voltage waveforms during the switching with a feed forward circuit according to the present invention under the output of 48A and 5A.
Figure 9B:
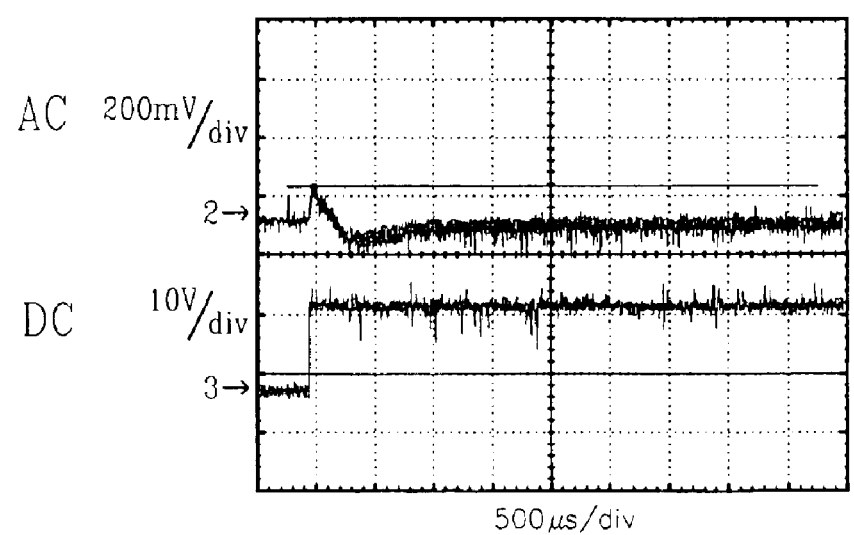

FIG. 8 shows a schematic diagram of the relationship among the switch signal, the voltage of the voltage regulator, and the output voltage with a feed forward circuit according to the present invention. In FIG. 8, the feed forward signal Vg2 is a differential of the switch signal. Due to at the switching instant, the feed forward signal Vg2 is feedback to the feedback network and so the interference from the switching operation can be rapidly restrained. Compared with that shown in FIG. 4, the regulating rate of the duty cycle in the converter with the feed forward circuit becomes more fast during switching under other conditions is the same. FIG. 9A and FIG. 9B show the output voltage waveforms during the switching with a feed forward circuit according to the present invention under the same condition in FIG. 5. The waveforms in FIG. 9B are enlarged from the waveforms in FIG. 9A. In FIG. 9A and FIG. 9B, a peak voltage is 120 mV during switching, compared with that in FIG. 5, the peak voltage is obviously restrained.

Figure 10:
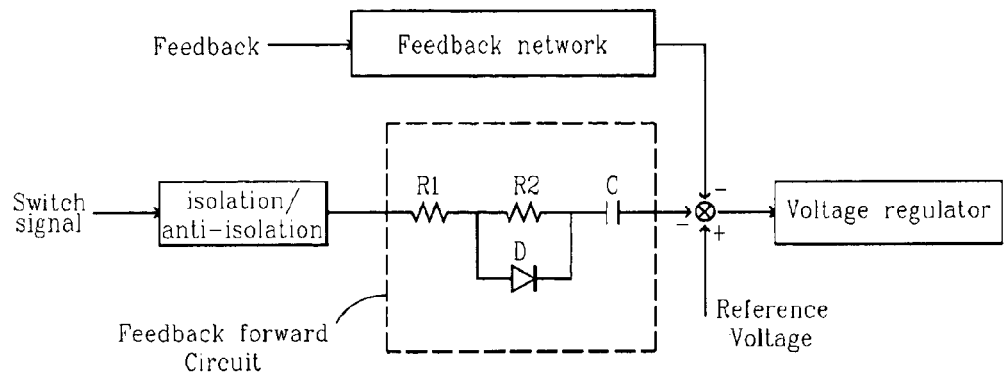
FIG. 10 is a schematic diagram of a feed forward circuit of one preferred embodiment according to the present invention.

A common feedback circuit can be suitably modulated as the feed forward circuit of the present invention for efficiently restraining and reducing the peak voltage, e.g.: a differentiator. FIG. 10 is a schematic diagram of a topology circuit of one preferred embodiment according to the present invention, wherein the power supply is not shown. In FIG. 10, the feed forward circuit is a differentiator comprising the resistors R1, R2, the diode D and the capacitor C. Therefore, the switching signal can be transferred to a pulse signal to the voltage regulator. The relationship of the switch signal generator and the feed forward signal generator is isolated or anti-isolated, i.e.: directly or indirectly coupled with each other. The isolating method comprises adding a transformer, photo coupler, etc. between them. The power supply can be the typical power supply. Hence, the feed forward circuit is very simple and can efficiently restrains and reduces the peak voltage.

Figure 11:
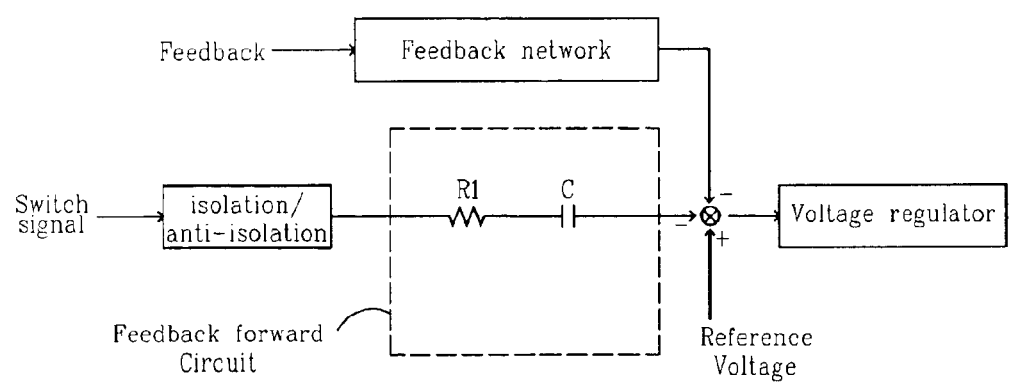
FIG. 11 is a schematic diagram of a feed forward circuit of another preferred embodiment according to the present invention.

FIG. 11 is a schematic diagram of a topology circuit of another preferred embodiment according to the present invention wherein the power supply is not shown. In FIG. 11, the feed forward circuit is a differentiator comprising the resistors R1 and the capacitor C. The feed forward circuit shown in FIG. 11 is also very simple and can efficiently restrains and reduces the peak voltage.

As aforementioned, the present invention provides a power supply with a feed forward circuit comprising a power supply, a switch signal generator, and a feed forward circuit. The power supply comprises a transformer, a switch, a rectifier circuit, and a filter circuit. When a feed forward circuit receives a switch signal, the switch is switched to change a turns ratio of the transformer. The feed forward circuit simultaneously receives the switch signal and then transmits a feed forward signal to a feedback circuit for restraining a peak voltage of a output voltage of the power supply resulted from the turns ratio changing.

The present invention also provides a method for restraining a switching peak voltage of a power supply with a feed forward circuit comprising: providing a power supply, providing a switch signal generator, and providing a feed forward circuit. When a feed forward circuit receives a switch signal, a switch of the power supply is switched to change a turns ratio of a transformer of the power supply. The feed forward circuit simultaneously receives the switch signal and then transmits a feed forward signal to a feedback circuit for restraining a peak voltage of a output voltage of the power supply resulted from the turns ratio changing.

Hence, in the conventional arts, a power supply with a voltage holdup circuit has the problem of peak voltage during a switching duration and the quality of the output voltage is decrease, so that some unexpected problems will occur. The present invention provides a feed forward circuit, that can be a simple differentiator, for reducing the magnitude of the peak voltage with low cost and for improving the quality of output of the power supply.

Although specific embodiments have been illustrated and described, it will be obvious to those skilled in the art that various modifications may be made without departing from what is intended to be limited solely by the appended claims.

We claim:

1. A power supply with a feed forward circuit, said power supply comprising:
    a power supply comprising:
    a transformer comprising a primary winding and a secondary winding, wherein said transformer transforming an input voltage to an output voltage and a turns ratio of said primary winding and secondary winding changing according to a switch signal;
    a switch receiving said switch signal to proceed a switch operation;
    a rectifier circuit connecting to said secondary winding and rectifying said output voltage;
    a switch signal generator generating said switch signal; and
    a feed forward circuit directly receiving said switch signal to transmit a feed forward signal to a feedback circuit to restrain a peak voltage of said output voltage resulted from said turns ratio changing.

2. The power supply in claim 1, said secondary winding comprises:
    a first secondary winding; and
    a second secondary winding,
    wherein when said switch not receiving said switch signal, said turns ratio of said transformer being a ratio of turns of said primary winding and turns of said first secondary winding; and when said switch receiving said switch signal, said turns ratio of said transformer being a ratio of the turns of said primary winding and turns of said first secondary winding plus said second secondary winding.

3. The power supply in claim 2, said rectifier circuit comprises a first rectifier and a second rectifier, wherein when said switch not receiving said switch signal, said first rectifier rectifying said output voltage; when said switch receiving said switch signal, said second rectifier rectifying said output voltage.

4. The power supply in claim 3, said first rectifier and said second rectifier are diode rectifiers.

5. The power supply in claim 1, said switch is MOSFET.

6. The power supply in claim 1, said feed forward circuit is a differentiator.

7. The power supply in claim 6, said differentiator comprises a capacitor, two diodes, and two resistances.

8. The power supply in claim 6, said differentiator comprises a capacitor and a resistance.

9. The power supply in claim 1, said switch signal generator generates said switch signal when an input voltage of said switch signal generator is lower than a predetermined voltage.

10. A power supply with a feed forward circuit, said power supply comprising:
    a bulk capacitor filtering noises in said DC voltage;
    a DC/DC converter transferring a voltage across said bulk capacitor to a first output voltage;
    a power supply comprising:
    a transformer comprising a primary winding and a secondary winding, wherein said transformer transforming said first output voltage to a second output voltage and a turns ratio of said primary winding and secondary winding changing according to a switch signal;
    a switch receiving said switch signal to proceed a switch operation;
    a rectifier circuit connecting to said secondary winding and rectifying said output voltage;
    a switch signal generator generating said switch signal; and
    a feed forward circuit directly receiving said switch signal to transmit a feed forward signal to a feedback circuit to restrain a peak voltage of said second output voltage resulted from said turns ratio changing.

11. The power supply in claim 10, said secondary winding comprises:
    a first secondary winding; and
    a second secondary winding,
    wherein when said switch not receiving said switch signal, said turns ratio of said transformer being a ratio of turns of said primary winding and turns of said first secondary winding; and when said switch receiving said switch signal, said turns ratio of said transformer being a ratio of the turns of said primary winding and turns of said first secondary winding plus said second secondary winding.

12. The power supply in claim 11, said rectifier circuit comprises a first rectifier and a second rectifier, wherein when said switch not receiving said switch signal, said first rectifier rectifying said second output voltage; when said switch receiving said switch signal, said second rectifier rectifying said second output voltage.

13. The power supply in claim 10, said feed forward circuit is a differentiator.

14. The power supply in claim 13, said differentiator comprises a capacitor, two diodes, and two resistances.

15. The power supply in claim 13, said differentiator comprises a capacitor and a resistance.

16. The power supply in claim 10, said switch signal generator generating said switch signal when said voltage across said bulk capacitor is lower than a predetermined voltage.

17. A method for restraining a switching peak voltage of a power supply with a feed forward circuit, said method comprising:
    providing a power supply, said power supply comprising:
    a transformer comprising a primary winding and a secondary winding, wherein said transformer transforming a input voltage to a output voltage and a turns ratio of said primary winding and secondary winding changing according to a switch signal;
    a switch receiving said switch signal to proceed a switch operation;
    a rectifier circuit connecting to said secondary winding and rectifying said output voltage;
    providing a switch signal generator, said switch signal generator generating said switch signal; and providing a feed forward circuit, said feed forward circuit directly receiving said switch signal to transmitting a feed forward signal to a feedback circuit to restrain a peak voltage of said output voltage resulted from said turns ratio changing.

18. The method in claim 17, said secondary winding comprises:

a first secondary winding; and a second secondary winding, wherein when said switch not receiving said switch signal, said turns ratio of said transformer being a ratio of turns of said primary winding and turns of said first secondary winding; and when said switch receiving said switch signal, said turns ratio of said transformer being a ratio of the turns of said primary winding and turns of said first secondary winding plus said second secondary winding.

19. The method in claim 18, said rectifier circuit comprises a first rectifier and a second rectifier, wherein when said switch not receiving said switch signal, said first rectifier rectifying said output voltage; when said switch receiving said switch signal, said second rectifier rectifying said output voltage.

20. The method in claim 19, said first rectifier and said second rectifier are diode rectifiers.

* * * * *